3,441,361
DYED POLYVINYL ACETAL SHEET CONTAINING AN ALKYLATED HYDROXY PHENYL BENZO-TRIAZOLE STABILIZER
Jacques J. Tocatlian, Trenton, N.J., assignor to Monsanto Company, St. Louis, Mo., a corporation of Delaware
No Drawing. Filed Jan. 5, 1965, Ser. No. 423,572
Int. Cl. D06p 3/00, 5/00
U.S. Cl. 8—4
9 Claims

ABSTRACT OF THE DISCLOSURE

Light stabilized colored polyvinyl acetal sheets, suitable for use as interlayer material for pellucid laminates; which contain at least 0.10%, based on the weight of the polyvinyl acetal resin, of an alkylated hydroxy phenyl benzotriazole.

---

This invention relates to substantially transparent colored plastic and more particularly to colored plasticized polyvinyl acetal sheeting and laminates.

Shatter resistant, light transmitting laminates for vehicles and the like can be constructed from pairs of glass or rigid panels laminated together by an interposed adhesive sheeting of plasticized polyvinyl acetal.

A further safety factor can be incorporated into laminates of this type by tinting or coloring the same, which serves to minimize the transmission of glare and other objectionable radiations. One method of accomplishing this broadly involves printing the acetal sheets with an ink of selected color. More particularly, and taking the rotogravure method of printing as illustrative, the ink is transferred from the printing rolls of the press to the surface of the polyvinyl acetal sheet. The printing roll is designed to deposit decreasing amounts of ink across the width of the sheet to produce a gradient or uniform diminishing of color. This is done so that a windshield will have a heavy coloring at the top portion which gradually diminishes from the top to the center of the windshield for maximum visibility with a minimum of glare from the solar system above. The ink is then diffused into the polyvinyl acetal sheeting to obtain a solid tinting or coloring effect by subjecting the printed sheets to a seasoning process which usually involves maintaining them at a temperature of 20–60° C. for a period ranging from 3 to 60 days. In order that the coloring or dyes do not break down during this rather rigorous seasoning process, a thermal stabilizer is incorporated into the ink. Typical stabilizers used to prevent dye breakdown during the seasoning process include triphenyl phosphate, 2-imidazolidinethiol, 4,4'-isopropylidene bisphenol. Unfortunately, these stabilizers have little or no affect on the sensitivity of the dyes within the plastic to light over long periods of time. Consequently, the colored or tinted polyvinyl acetal sheet tends to undergo a color change over long periods of time which is particularly noticeable in the less densely colored portions of the plastic sheeting.

Accordingly, it is a principal object of the present invention to provide an improved polyvinyl acetal sheet.

Another object is to provide an improved tinted plasticized polyvinyl acetal sheet in which the color is light stable over long periods of time.

Another object is to provide unitary light transmitting laminates comprising a pair of rigid pellucid panels laminated together utilizing an interposed tinted or colored sheet of plasticized polyvinyl acetal.

Other objects of the present invention will in part be obvious and will in part appear hereinafter.

These and other objects are attained by incorporating in a plasticized polyvinyl acetal resin sheet prior to printing 0.10% to 1.2% by weight of an alkylated hydroxyphenyl benzotriazole based on the weight of the polyvinyl acetal resin and thereafter coating the surface of said sheet with an ink composition comprising, in combination, a solvent, and a dye soluble in said solvent and diffusible in said plasticized polyvinyl acetal.

The following examples are given to illustrate the invention and are not intended as limitations thereof. Unless otherwise indicated, the polyvinyl acetal resin used throughout these examples is polyvinyl acetal resin having an Alkalinity Titer of approximately 30, a moisture content of 2.0% and contains approximately 19% hydroxyl groups calculated as polyvinyl alcohol and approximately 2% acetate groups calculated as polyvinyl acetate, the balance being substantially acetal. The Alkalinity Titer as used herein is an arbitrary standard generally used in the safety glass industry and is defined as the number of milliliters of 0.01 normal hydrochloric acid required to neutralize a 100 gram solution of the resin (a 3% methanol solution) to a neutral end point using bromphenol blue indicator. Unless otherwise specified, quantities are mentioned on a weight basis.

EXAMPLE I

This example represents a control which demonstrates the effect of light on a printed colored sheet of polyvinyl acetal in the absence of a light stabilizer even though a heat stabilizer is incorporated into the ink.

Part A

One thousand parts of polyvinyl butyral resin are intimately admixed for 30 minutes with 420 parts of triethylene glycol di(2-ethyl butyrate) plasticizer. The resulting mixture is then extruded in a conventional extruder at a pressure and temperature of 1200 p.s.i. and 400° F. respectively to form a sheet 0.030 inch thick and six inches in width.

Part B

A printing ink is prepared by dissolving 4.1 parts of polyvinyl butyral and 1.7 parts of triethylene glycol di(2-ethyl butyrate) in 70 parts of propylene dichloride and 30 parts of butanol. To the resulting solution add 4.5 parts of Oil Blue A (C. I. Solvent Blue 36), 4.15 parts of Oil Yellow (C. I. Solvent Yellow 46), 3.3 parts of Pink dye, C. I. 60710 and 4.0 parts of a thermal stabilizer 4,4'-isopropylidene bisphenol.

Eight parts of the resulting ink are then printed on the surface of the plasticized polyvinyl butyral sheet prepared in Part A using a rotogravure printing machine. This machine is designed to deposit a four inch printed band which uniformly decreases in color density across the width of the sheet to produce a smooth gradient or diminishing in color density from one edge of the sheet to about four inches in from the edge at which point no coloration can be visibly seen. The remaining two inches of sheet width are not printed in this process. The sheet is then dusted with a bicarbonate of soda and rolled up and in this condition subjected to a temperature of about 100° C. for 24 hours to diffuse the dye into the body of the plastic.

Part C

A set of four glass laminates are individually prepared by washing bicarbonate of soda from the sheet prepared in Part B above and interposing lengthwise portions of the sheet between 4 x 6 x 0.125 inch thick plates of glass. The resulting laminates are then subjected to a temperature of 275° F. and a pressure of 185 p.s.i. for approximately ten minutes to bond each laminate assembly together.

Two of the laminates prepared above are subjected to a "light stability" test which involves one thousand hours exposure in an Atlas Fadeometer utilizing a violet carbon arc. This test is well known in the industry and extensively employed. More specifically, the Fadeometer equipment emits spectral radiation within the range of 270 millimicrons to 4000 millimicrons with the substantial portion of the radiation maintained in the ultra-violet and near ultra-violet regions, that is, 270 millimicrons to 420 millimicrons having a minor peak of approximately 4200 microwatts per square meter at 360 millimicrons and a major peak of approximately 5000 microwatts per square meter at 390 millimicrons. The temperature of the laminate during the 1000 hour exposure period is maintained at about 130° F.

The test results are comparative, that is, unexposed control laminates are compared visually with identical laminates which have been exposed to the 1000 hour Fadeometer radiation. The color change due to Fadeometer radiation is most noticeable at the less color dense portion of the gradient and is graded based primarily on the color change at this portion. This color change is considered a measure of light stability.

Comparative results of the exposed laminates prepared in this example and the unexposed laminates are shown in Table I.

TABLE I

Laminate: Visual grading
Unexposed _____ Neutral Blue (as printed).
Exposed (1000 hours)_ Hue changed to bluish yellow.

It is apparent from the above Table I that a breakdown in the coloration occurs after 1000 hours exposure to Fadeometer radiation.

EXAMPLE II

This example demonstrates the effectiveness of various compounds which are dispersed in the printing ink. These compounds were selected because they are generally considered to be light stabilizers. One of these compounds is 2(2'-hydroxy 5'methyl phenyl) benzotriazole. As indicated, this latter compound is within the scope of this invention as described above and is referred to herein as the standard.

Part A

Five sheets of plasticized polyvinyl butyral are individually prepared in accordance with the procedure of Example I, Part A.

Part B

A printing ink is prepared by dissolving 4.1 parts of polyvinyl butyral and 1.7 parts of triethylene glycol di(2-ethyl butyrate) in 70 parts of propylene dichloride and 30 parts of butanol. To the resulting solution add 4.5 parts of Oil Blue A (C. I. Solvent Blue 36), 4.15 parts of Oil Yellow (C. I. Solvent Yellow 46), 3.3 parts of Pink dye, C. I. 60710, and 4 parts of a thermal stabilizer 4,4' isopropylidene bisphenol.

Five equal eight part portions of the above ink are measured out. To the first of these ink portions is added 2.0 parts of 2(2'hydroxy 5'methyl phenyl) benzotriazole as the standard while to each of the four others, 2.0 parts, of each of the compounds identified below, is added. Each of the ink portions (including the standard) is then printed onto one of the sheets of plasticized polyvinyl butyral prepared in Part A of this example in accordance with the procedure of Part B of Example I. The sheets are then dusted with a bicarbonate of soda and rolled up and in this condition subjected to a temperature of about 100° C. for 24 hours to diffuse the dye into the body of the plastic.

Part C

Four laminates are prepared from each of the above printings by washing the bicarbonate of soda from the sheets prepared in Part B above and interposing four portions of each sheet individually between 4 x 6 x 0.125 inch thick plates of glass. The resulting laminates are then subjected to a temperature of 275° F. and a pressure of 185 p.s.i. for approximately ten minutes to bond each laminate assembly together.

Two of the laminates from each printing are subjected to "light stability" tests as described in Example I. The results of these tests are set forth in Table II. All of the unexposed samples are identical in color and are neutral blue.

TABLE II

| Compound | | Visual grading after 1,000 hours fadeometer exposure |
|---|---|---|
| Standard | 2(2'hydroxy 5'methyl phenyl) benzotriazole. | Bluish-yellow. |
| 1 | 2,2'dihyrdoxy-4 methoxybenzophenone. | Yellow. |
| 2 | 2,2'dihydroxy-4,4'-dimethoxy benzophenone. | Bluish-yellow. |
| 3 | 2,2'dihydroxy 4 octoxy benzophenone. | Do. |
| 4 | 2,4,5 trihydroxy benzophenone | Slightly bluish-yellow. |

It is apparent from Table II that a breakdown in color after 1000 hours exposure has occurred with all the samples including the standard. Furthermore, the standard result is not considered as good as some of the other compounds tested above.

EXAMPLE III

This example demonstrates the effectiveness of the same compounds employed in Example II except that the compounds are dispersed in the plastic rather than the ink.

Part A

The procedure of Part A of Example I is followed five separate times referred to herein as runs. In the first of these runs 2.0 parts of 2(2'hydroxyl 5'methyl phenyl) benzotriazole as a standard are dissolved in the triethylene glycol di(2-ethyl butyrate) plasticizer at a temperature of 80° F. before being admixed with the polyvinyl butyral resin while to each of the other runs 2.0 parts of the same compounds used in Example II are identified in Table II are similarly dissolved.

Part B

An ink is prepared according to the procedure of Part B of Example I and applied in accordance with that procedure to sheeting from each of the five runs of Part A of this example.

Part C

The procedure of Part C of Example I is followed for each run including the standard. The results of the "light stability" tests are set forth in Table III. All of the unexposed samples are identical in color and are neutral blue.

TABLE III

| Compound | | Visual grading after 1,000 hours fadeometer exposure |
|---|---|---|
| Standard | 2(2'hydroxy 5'methyl phenyl) benzotriazole. | Neutral-blue. |
| 1 | 2,2'dihydroxy-4 methoxybenzophenone. | Yellow. |
| 2 | 2,2'dihydroxy-4,4'-dimethoxy benzophenone. | Bluish-yellow. |
| 3 | 2,2'dihydroxy 4 octoxy benzophenone. | Do. |
| 4 | 2,4,5 trihydroxy benzophenone | Slightly bluish-yellow |

It is apparent from Table III that a substantial breakdown in color after 1000 hours exposure has occurred with all the samples except the standard. The color of the exposed standard shows no yellowing and has retained its blue hue.

EXAMPLE IV

This example demonstrates the effectiveness of various proportions of the 2(2'hydroxyl 5'methyl phenyl) benzotriazole stabilizer in the admixture of polyvinyl butyral and plasticizer.

Part A

The procedure of Part A of Example I is followed six different times, referred to herein as runs, except that the plasticizer used in each run contains varying proportions of 2(2'hydroxyl 5'methyl phenyl) benzotriazole stabilizer as follows:

| | Amount of stabilizer, parts |
|---|---|
| 1 | 0.05 |
| 2 | 0.10 |
| 3 | 0.20 |
| 4 | 0.30 |
| 5 | 0.50 |
| 6 | 1.00 |

Part B

The procedure of Part B of Example I is followed with respect to each of the six runs of part A of this example.

Part C

The procedure of Part C of Example I is followed with respect to each of the six runs of Part B of this example. The results of the "light stability" tests are set forth in Table IV.

TABLE IV

| Proportion of stabilizer | Coloration after 1,000 hrs. fadeometer exposure | |
|---|---|---|
| (1) 0.05 | Bluish yellow, some loss of color | Unsatisfactory. |
| (2) 0.10 | Slightly bluish yellow, slight loss of color. | Borderline. |
| (3) 0.20 | Held neutral blue, very slight loss of color. | Satisfactory. |
| (4) 0.30 | do | Do. |
| (5) 0.50 | do | Do. |
| (6) 1.00 | do | Do. |

It is apparent from these results that the amount of 2(2'hydroxyl 5'methyl phenyl) benzotriazole necessary to stabilize the color should be at least 0.10% by weight of the resin to be effective.

EXAMPLE V

The procedure of Example IV is followed two separate times, referred to herein as runs, except that the dye composition which comprised 4.5 parts of Oil Blue A (C. I. Solvent Blue 36), 4.15 parts of Oil Yellow (C. I. Solvent Yellow 46), and 3.3 parts of Pink dye, C.I. 60710 is replaced by one of the two following dye compositions.

Run:        Dye composition

1 ___. 4.5 parts Oil Blue A (C.I. Solvent Blue 36).
       1.6 parts Oil Yellow (C.I. Solvent Yellow 46).
2 ___. 2.7 Pink dye C.I. 60710.
       2.5 Oil Blue A (C.I. Solvent Blue 36).
       1.6 Oil Yellow (C.I. Solvent Yellow 46).

The results of the "light stability" tests obtained on the laminates of this example are substantially similar to those obtained in Example IV.

EXAMPLE VI

The procedure of Example III is followed five separate times except that each time the procedure is carried out, one of the following alkylated hydroxyl phenyl benzotriazoles are used in place of 2'(2'-hydroxy-5'-methyl phenyl) benzotriazole.

Run:        Compound

1 ___. 2'(2'-hydroxy 5'ethyl phenyl) benzotriazole.
     2'(2'-hydroxy 5'butyl phenyl) benzotriazole.
3 ___. 2'(2'-hydroxy 5'pentyl phenyl) benzotriazole.
4 ___. 2'(2'-hydroxy 5'octyl phenyl) benzotriazole.
5 ___. 2'(2'-hydroxy 5'decyl phenyl) benzotriazole.

The results of the "light stability" tests obtained on the laminates of this example are substantially similar to those obtained in Example III.

The present invention is concerned with the production of a light stable gradient colored polyvinyl acetal sheeting useful as interlayers for safety laminates. This is accomplished by incorporating into the body of the plasticized polyvinyl acetal sheet 0.10 to 1.2 parts by weight of an alkylated hydroxy phenyl benzotriazole per 100 parts of polyvinyl acetal resin, prior to printing the sheet with a dye diffusible in the plastic. Normally, stabilizers whether they are light, thermal or other types, are incorporated in the ink with the dye. However, in this case it was found that the alkylated hydroxyphenyl benzotriazole stabilizer incorporated in the ink did not effectively stabilize the color particularly in the less color dense portions of the gradient. However, it was found that when the same stabilizer was incorporated into the resin-plasticizer mixture prior to printing, the "light stability" results far exceeded other stabilizers tested even one that performed better when an ink comparison was made.

The light stabilizers employed in the present invention are alkylated hydroxyphenyl benzotriazoles. More specifically, the light stabilizers are alkylated hydroxyphenyl benzotriazoles having the structural formula:

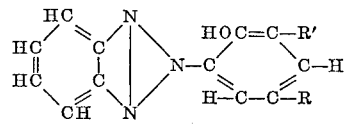

wherein R is an alkyl radical having 1 to 12 carbon atoms and R' is selected from the group consisting of hydrogen and an alkyl radical having 1 to 12 carbon atoms. Preferably, R is a methyl radical and R' is hydrogen.

In the preferred method, the alkylated hydroxylphenyl benzotriazole stabilizer is dissolved in the plasticizer, which is subsequently admixed with polyvinyl acetal resin and extruded. The temperature of the plasticizer can vary within wide limits during the dissolving stage depending of course on the solubility and amount of stabilizer. Generally, this temperature will vary between 50° F. to 150° F. However, it is possible to incorporate the stabilizer in the body of the plastic prior to printing by other means. For example, the alkylated hydroxyphenyl benzotriazole stabilizer can be incorporated in the resin which is subsequently admixed with the plasticizer.

The dyes prescribed for use are those which contain 2 to 4 cyclic nuclei in the dyestuff molecule. By cyclic nuclei, are meant aromatic nuclei such as benzene, naphthalene, anthracene, etc., nuclei and heterocyclic nuclei such as pyrazolone rings. Dyes of this type are soluble in chlorinated hydrocarbon or ketone solvents. Examples of these dyestuffs are Oil Yellow (C.I. Solvent Yellow 46), Oil Blue A (C.I. Solvent Blue 36), Violet dye, C.I. 61100; blue dye, C.I. 61525 and various mixtures of the same. The amount of dye used will depend upon the color and intensity of the same desired. It can easily vary anywhere from 0.01 to 10 parts per 100 parts of resin.

The inks may also contain a small amount of a polyvinyl acetal resin. Suggested are polyvinyl butyral resins containing up to 25% hydroxyl groups calculated as polyvinyl alcohol, up to 3% acetate groups calculated as polyvinyl acetate with the balance of the resin being polyvinyl butyral. The amount of resin to be used generally ranges between 25 to 100% on the weight of the dyestuff.

When the inks are designed for printing on plasticized polyvinyl butyral resin sheets for safety glass purposes, it is further suggested that the resin incorporated in the inks contain from 15 to 60 parts of plasticizer per 100 parts of the polyvinyl butyral resin. Preferably, the plasticizer should be similar to that already present in the sheet designed for printing. Plasticizers which can be used include triethylene glycol-di-(2-ethyl butyrate), dibutyl sebacate, di(beta-butoxyethyl) adipate and others.

The solvent for the dyes can be a single solvent or mixture of solvents, and preferably for the resin as well. Single solvents which can be used are ketones such as cyclohexanone in which the dye is soluble. Mixed solvents which can be used include mixtures of alcohols with chlorinated hydrocarbons and ketones and others. Examples of the mixed solvents include propylene dichloride-butanol, cyclohexanone-butanol, dimethyl-formamide-xylene, also acetone or methyethyl and the like. The type and amount of solvent to be used will depend upon the compatibility of the same with the dyestuff and the resin, as well as the physical characteristics thereof such as viscosity and volatility depending upon the particular printing process and apparatus designed for use. For printing in accordance with the gravure process set forth earlier, the viscosity of the ink is proposed to be limited to between 10 to 500 cps. In general, the amount of solvent will vary between 2000 and 4000 parts per 100 parts of resin in the sheet.

The polyvinyl acetal resins which are employed in the present invention may be made from various unsubstituted aldehydes or mixtures thereof or even from unsubstituted ketones containing an active carbonyl group or from mixtures of unsubstituted aldehydes and ketones. Thus, formaldehyde, acetaldehyde, propionaldehyde, butyraldehyde, valeraldehyde, hexaldehyde, benzaldehyde, crotonaldehyde, cyclohexanone and the like and mixtures thereof may be utilized. In general, the acetal resin is made by reacting an aldehyde with hydrolyzed polyvinyl ester in the presence of a solvent for the product and precipitating the resin product with water. Alternate methods might include carrying out the reaction in the presence of a non-solvent dispersing medium such as water or a non-solvent mixture of water and solvent, e.g., a water-ethanol mixture. More detailed methods for preparing such resins are set forth in Morrison et al. U.S. Patent No. Re. 20,430, dated June 29, 1937, and Lavin et al. U.S. Patent No. 2,496,480. In general, polyvinyl acetal resins made from saturated lower unsubstituted aliphatic aldehydes are the most suitable. These would include polyvinyl acetal resins made from unsubstituted saturated aliphatic aldehydes containing less than 6 carbon atoms and especially those made from formaldehyde, acetaldehyde, butyraldehyde and mixtures thereof. Particularly preferred are polyvinyl acetal resins made from butyraldehyde.

In general, the polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyraldehyde acetal, the polyvinyl acetal resin will preferably contain, on a weight basis, from 16 to 25% hydroxyl groups, calculated as polyvinyl alcohol and from 0 to 3% acetate groups, calculated as polyvinyl acetate, the balance being substantially butyraldehyde acetal.

Any suitable plasticizer may be used in preparing polyvinyl acetal compositions useful as interlayers. In general, the plasticizers which are commonly employed are esters of a polybasic acid or a polyhydric alcohol. Among the suitable plasticizers are triethylene glycol di(2-ethyl butyrate), triethylene glycol dihexoate, glyceryl monooleate, dibutyl sebacate and di(beta-butoxyethyl) adipate, dialkyl phthalates, i.e., dioctyl phthalate, dibutoxy ethyl phthalate, etc. Plasticizers which also may be included are triaryl phosphates, i.e., tricresyl phosphate, butyl ricinoleate and the like. When desired, mixtures of these and other types of plasticizers may also be included in the compositions, examples of which are well known to those skilled in the art. Particularly preferred are partial ester plasticizers which are monoesters of glycerin made with aliphatic carboxylic acids containing ethylenic unsaturation and from 10 to 20 carbon atoms.

The amount of plasticizer to be added to the polyvinyl acetal resin may be varied within wide limits in order to prepare compositions having different initial viscosities. Mixtures containing up to 100 parts of plasticizer per 100 parts of polyvinyl acetal resin may be used with satisfactory results. However, for general safety laminate use, the plasticizer content should be between 15 to 60 parts per 100 parts of polyvinyl acetal resin and more preferably 20 to 50 parts per 100 parts of polyvinyl acetal resin.

The plastic interlayers which are produced in the practice of this invention are generally produced by comalaxing polyvinyl acetal resin with a compatible plasticizer. The resulting mixture is then shaped into film or sheets by any conventional film forming means such as extrusion, roll milling, hot pressing, etc. or may even be solvent-cast, if desired. The alkylated hydroxyphenyl benzotriazole stabilizer is incorporated into the plastic prior to printing and the sheet is printed as previously described to produce a color gradient across the sheet. The alkylated hydroxyphenyl are generally commercially available. One method of manufacture is to couple O-nitro phenyl diazonium chloride with the desired amount of hydroxyl compound and reducing with ammonium sulfide or zinc in an alkaline medium.

The laminates are then prepared by interposing the plasticized polyvinyl acetal interlayer between a pair of pellucid panels and then laminating by any suitable method which generally comprises subjecting the resulting assembly to a temperature of about 200 to 325° F. and a pressure of 150 to 300 p.s.i. for at least ten minutes to bond the assembly together. More detailed methods may be found in U.S. Patent No. 2,290,193 and U.S. Patent No. 2,948,645.

Safety glass laminates find special application in the automotive and aircraft industries for protecting passengers both against the hazards of flying objects and to reduce injury caused by bodily impact against the laminate. When the laminate has a color gradient incorporated therein, the passengers have additional protection from the effects of solar and other radiations. The laminates of the present invention will provide this protection over long periods of time. Wherever else glass or transparent panels are utilized such as in the building trade, the protection afforded by safety glass has become increasingly important. The laminates prepared using the process of the present invention increase the advantages of utilizing safety glass because of their improved safety performance and the improved ease and economics of production.

It is obvious that many variations may be made in the products and processes set forth above without departing from the spirit and scope of this invention.

What is claimed is:

1. In interlayer material for pellucid laminates comprising a plasticized polyvinyl acetal sheet, containing a dye having 2 to 4 cyclic nuclei in the dyestuff molecule, the improvement which consists of the presence of from 0.1 to 1.2 parts by weight, per 100 parts of polyvinyl acetal of an alkylated hydroxyphenyl benzotriazole stabilizer in the polyvinyl acetal sheet, wherein the alkyl substituent on the benzotriazole stabilizer contains from 1 to 12 carbon atoms.

2. The polyvinyl acetal sheet of claim 1 wherein the alkylated hydroxyphenyl benzotriazole is 2(2'hydroxy 5'methyl phenyl) benzotriazole.

3. The polyvinyl acetal sheet of claim 1 wherein the polyvinyl acetal is polyvinyl butyral.

4. The polyvinyl acetal sheet of claim 1 wherein the plasticizer is triethylene glycol di(2-ethyl butyrate).

5. In colored plastic sheet adapted for use as an interlayer for pellucid laminates said sheet comprising 100 parts by weight of polyvinyl acetal, 15 to 60 parts by weight of a compatible plasticizer for the polyvinyl acetal and a dye having 2 to 4 cyclic nuclei in the dyestuff molecule, the improvement which consists of the presence of from 0.1 to 1.2 parts by weight of an alkylated hydroxyphenyl benzotriazole stabilizer in the polyvinyl acetal sheet, wherein the alkyl substituent on the benzotriazole stabilizer contains from 1 to 12 carbon atoms.

6. The colored plastic sheet of claim 5 wherein the polyvinyl acetal is polyvinyl butyral.

7. The colored plastic sheet of claim 5 wherein the alkylated hydroxyphenyl benzotriazole is 2(2'hydroxy 5'methyl phenyl) benzotriazole.

8. In the method for producing colored polyvinyl acetal interlayer material for pellucid laminates, which method comprises printing the surface of said sheet with an ink composition comprising, in combination, a solvent and a dye having 2 to 4 cyclic nuclei in the dyestuff molecule, said dye being soluble in said solvent and diffusible in said plasticized polyvinyl acetal, the improvement which consists of incorporating into the polyvinyl acetal interlayer material from 0.1 to 1.2 parts by weight, per 100 parts of polyvinyl acetal of an alkylated hydroxyphenyl benzotriazole stabilizer prior to printing the surface of the sheet with the ink composition, wherein the alkyl substituent on the benzotriazole stabilizer contains from 1 to 12 carbon atoms.

9. In the method for producing a colored plasticized polyvinyl butyral interlayer for pellucid laminates, which method comprises printing the surface of said sheet with an ink composition comprising, in combination, a solvent and a dye having 2 to 4 cyclic nuclei in the dyestuff molecule, said dye being soluble in said solvent and diffusible in said plasticized polyvinyl acetal, the improvement which consists of incorporating into the polyvinyl butyral from 0.1 to 1.2 parts by weight, per 100 parts of polyvinyl butyral resin, of an alkylated hydroxyphenyl benzotriazole stabilizer prior to printing the surface of the sheet with the ink composition, wherein the alkyl substituent on the benzotriazole stabilizer contains from 1 to 12 carbon atoms.

References Cited

UNITED STATES PATENTS

| 2,710,274 | 6/1955 | Kuehl | 8—4 X |
| 2,739,080 | 3/1956 | Woodworth | 8—4 X |
| 3,076,782 | 2/1963 | Mohr et al. | 8—74 X |

FOREIGN PATENTS

| 964,231 | 7/1964 | Great Britain. |

OTHER REFERENCES

A. F. Strobel: A.D.R., Aug. 7, 1961, pp. 21–26.

J. TRAVIS BROWN, *Primary Examiner.*

T. J. HERBERT, JR., *Assistant Examiner.*